United States Patent
Werner et al.

(10) Patent No.: US 10,883,847 B2
(45) Date of Patent: Jan. 5, 2021

(54) ROUTE SUGGESTION FOR TIME OPTIMIZATION

(71) Applicant: International Business Machines Corporation, Armonk, NY (US)

(72) Inventors: John S. Werner, Fishkill, NY (US); Arkadiy O. Tsfasman, Wappingers Falls, NY (US); Andrew G. Crimmins, Montrose, NY (US); Pasquale A. Catalano, Wallkill, NY (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 16/124,831

(22) Filed: Sep. 7, 2018

(65) Prior Publication Data

US 2020/0080858 A1 Mar. 12, 2020

(51) Int. Cl.
*G01C 21/34* (2006.01)
*G01C 21/36* (2006.01)
(Continued)

(52) U.S. Cl.
CPC ..... *G01C 21/3484* (2013.01); *G01C 21/3415* (2013.01); *G01C 21/365* (2013.01); *G06N 20/00* (2019.01); *H04W 4/024* (2018.02)

(58) Field of Classification Search
CPC .......... G01C 21/3484; G01C 21/3415; G01C 21/365; H04W 4/024; G06N 20/00
See application file for complete search history.

(56) References Cited

U.S. PATENT DOCUMENTS

| 8,669,845 B1 * | 3/2014 | Chakraborty | .......... | G06Q 50/00 235/440 |
| 8,933,808 B2 * | 1/2015 | Chakraborty | .......... | G01C 22/00 235/440 |

(Continued)

OTHER PUBLICATIONS https://www.usatoday.com/story/tech/news/2015/12/24/waze-skiing-uses-cell-phones-cameras-track-wait-times-vail/77801664/ "Waze for skiing uses cell phones, cameras to track wait times at Vail" Trevor Hughes, USA Today, Published Dec. 24, 2015 (Year: 2015).*

(Continued)

*Primary Examiner* — Thomas E Worden
(74) *Attorney, Agent, or Firm* — Heslin Rothenberg Farley & Mesiti P.C.; Teddi Maranzano, Esq.

(57) ABSTRACT

A method, computer program product, and a system where a processor(s) monitors movement of users within a physical environment including routes and transports, where the physical environment includes readers of signals or images of decodable indicia to monitor locations via these signals or images associated with the users, and where the signals or the images are valid for a pre-defined period of time. The processor(s) identifies a given user of the users. The processor(s) generates a movement profile for the given user that includes machine learned movement patterns and a proficiency measure. The processor(s) generates and transmits, based on the movement profile and the locations of the users, route guidance for the given user including a recommendation, consistent with the proficiency measure, for taking a specific route to a specific transport and comprises an optimized route to minimize wait time at the transports and maximize time spent on the routes.

20 Claims, 7 Drawing Sheets

(51) Int. Cl.
*H04W 4/024* (2018.01)
*G06N 20/00* (2019.01)

(56) References Cited

U.S. PATENT DOCUMENTS

| | | | | |
|---|---|---|---|---|
| 9,141,837 B2* | 9/2015 | Chakraborty | .......... | G06Q 50/00 |
| 9,195,867 B2* | 11/2015 | Chakraborty | .......... | G06Q 50/00 |
| 9,852,547 B2* | 12/2017 | Bostick | .................. | G06Q 50/01 |
| 2007/0057089 A1* | 3/2007 | Schroter | ................ | B60K 31/00 |
| | | | | 239/171 |
| 2007/0073524 A1* | 3/2007 | Song | ...................... | G01C 21/20 |
| | | | | 703/2 |
| 2009/0204320 A1* | 8/2009 | Shaffer | .............. | G01C 21/3415 |
| | | | | 701/533 |
| 2010/0148483 A1* | 6/2010 | Kopp | .................... | A63C 17/26 |
| | | | | 280/809 |
| 2014/0136105 A1* | 5/2014 | Chakraborty | .......... | G06Q 50/00 |
| | | | | 701/521 |
| 2014/0136106 A1* | 5/2014 | Chakraborty | .......... | G06Q 50/00 |
| | | | | 701/521 |
| 2014/0142847 A1* | 5/2014 | Chakraborty | .......... | G06Q 50/00 |
| | | | | 701/521 |
| 2015/0070140 A1* | 3/2015 | Chakraborty | .......... | G06Q 50/00 |
| | | | | 340/10.31 |
| 2015/0219470 A1* | 8/2015 | Hoffman | ................ | G01C 21/20 |
| | | | | 701/487 |
| 2016/0084664 A1* | 3/2016 | Margalit | ............ | G01C 21/3438 |
| | | | | 701/410 |
| 2016/0284125 A1* | 9/2016 | Bostick | .................. | G06Q 50/01 |
| 2018/0240176 A1* | 8/2018 | Cronin | .................... | H04L 67/22 |
| 2019/0017835 A1* | 1/2019 | Pickover | ............ | G01C 21/3484 |

OTHER PUBLICATIONS https://www.vail.com/the-mountain/more-options/epicmix.aspx Vail Resorts Management Company, Published 2020 First Published Dec. 9, 2018 (per waybackmachine.org) (Year: 2018).*
http://www.soft2ski.com/EN/system_for_ski_resorts.html Snow Project, by contact@soft2ski.com, Copyright 2016 (Year: 2016).*
Mell et al., "The NIST Definition of Cloud Computing", National Institute of Standards and Technology, U.S. Dept. of Commerce, NIST Special Publ. 800-145, Sep. 2011, 7 pages.

* cited by examiner

ROUTE SUGGESTION FOR TIME OPTIMIZATION

BACKGROUND

Much time spent at ski resorts is spent waiting on various lines at bases in order to reach a destination on the mountain from which a rider can partake in the sport the skier or rider paid to participate in. For simplicity, the term riders, rather than referring to snowboarders, exclusively, refers to any individual utilizing trails at a ski resort to recreate by navigating downhill, and includes skiers, snowboarders, ski boarders, ski bikers, tubers, snow skaters, telemarkers, etc. To reach a trail head, riders utilize a variety of forms of transportation from the bases, including, but not limited to, ski lifts, gondolas, cable cars, rope tows, j-bars, etc. For simplicity, these forms of transport from a base to an area proximate to a trail head at a ski resort (e.g., mountain or mountain range) are all referred to, generally, as lifts. To manage the availability of the mountain trails, many ski resorts offer a plurality of trails to riders that end at different bases. Thus, not every individual on the mountain is relying on taking a lift, to reach a trail, from the same starting point. The lines at these various locations may not be equivalent in length. But despite the attempts of ski resorts to diversify the locations of the lifts, riders may still experience long wait times and these long wait times negatively impact the rider's experience because the rider gets less value from a ticket purchase when the rider spends time waiting in line rather than enjoying the winter sport the rider purchased the ticket in order to enjoy. As lift tickets can be expensive (as can alpine sports themselves, based on the equipment necessary), a rider who perceives that he or she is wasting too much time on a given mountain waiting for the opportunity to ride is less likely to return to the mountain than a rider who feels that the price of the ticket was well worth the riding experience.

SUMMARY

Shortcomings of the prior art are overcome and additional advantages are provided through the provision of a method for providing a personalized optimized route to a user. The method includes, for instance: monitoring, by one or more processors, movement of users within a physical environment, wherein the physical environment comprises a plurality of routes to traverse and a plurality of transports, wherein each transport of the plurality of transports can be utilized by the users to reach a portion of the plurality of routes, wherein the physical environment further comprises one or more readers configured to read a signal or an image of decodable indicia, positioned at locations along the plurality of routes, wherein the monitoring comprises obtaining, from the readers, locations of the users, based on the readers accessing signals or images of decodable indicia associated with the users, when the users are within pre-defined ranges of the readers, and wherein the signals or the images of decodable indicia are valid for a pre-defined period of time; identifying, by the one or more processors, during the pre-defined period of time, a given user of the users within the physical environment; generating, by the one or more processors, a movement profile for the given user, wherein the movement profile comprises machine learned movement patterns for the given user, based on the monitoring, wherein the movement profile comprises a proficiency measure for the given user at navigating the physical environment; generating, by the one or more processors, based on the movement profile of the given user and the locations of the users, route guidance for the given user, wherein the route guidance comprises a recommendation for taking a specific route of the plurality of routes to a specific transport of the plurality of transports, wherein the recommendation is consistent with the proficiency measure of the given user and comprises an optimized route to minimize wait time at the plurality of transports and maximize time spent on the plurality of routes during the pre-defined period of time; and transmitting, by the one or more processors, the route guidance to the given user, such that the given user obtains the route guidance at a given location where contemporaneous with receiving the route guidance the user, based on the given location, can take the specific route.

Shortcomings of the prior art are overcome and additional advantages are provided through the provision of a computer program product for providing a personalized optimized route to a user. The computer program product comprises a storage medium readable by a processing circuit and storing instructions for execution by the processing circuit for performing a method. The method includes, for instance: monitoring, by the one or more processors, movement of users within a physical environment, wherein the physical environment comprises a plurality of routes to traverse and a plurality of transports, wherein each transport of the plurality of transports can be utilized by the users to reach a portion of the plurality of routes, wherein the physical environment further comprises one or more readers configured to read a signal or an image of decodable indicia, positioned at locations along the plurality of routes, wherein the monitoring comprises obtaining, from the readers, locations of the users, based on the readers accessing signals or images of decodable indicia associated with the users, when the users are within pre-defined ranges of the readers, and wherein the signals or the images of decodable indicia are valid for a pre-defined period of time; identifying, by the one or more processors, during the pre-defined period of time, a given user of the users within the physical environment; generating, by the one or more processors, a movement profile for the given user, wherein the movement profile comprises machine learned movement patterns for the given user, based on the monitoring, wherein the movement profile comprises a proficiency measure for the given user at navigating the physical environment; generating, by the one or more processors, based on the movement profile of the given user and the locations of the users, route guidance for the given user, wherein the route guidance comprises a recommendation for taking a specific route of the plurality of routes to a specific transport of the plurality of transports, wherein the recommendation is consistent with the proficiency measure of the given user and comprises an optimized route to minimize wait time at the plurality of transports and maximize time spent on the plurality of routes during the pre-defined period of time; and transmitting, by the one or more processors, the route guidance to the given user, such that the given user obtains the route guidance at a given location where contemporaneous with receiving the route guidance the user, based on the given location, can take the specific route.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
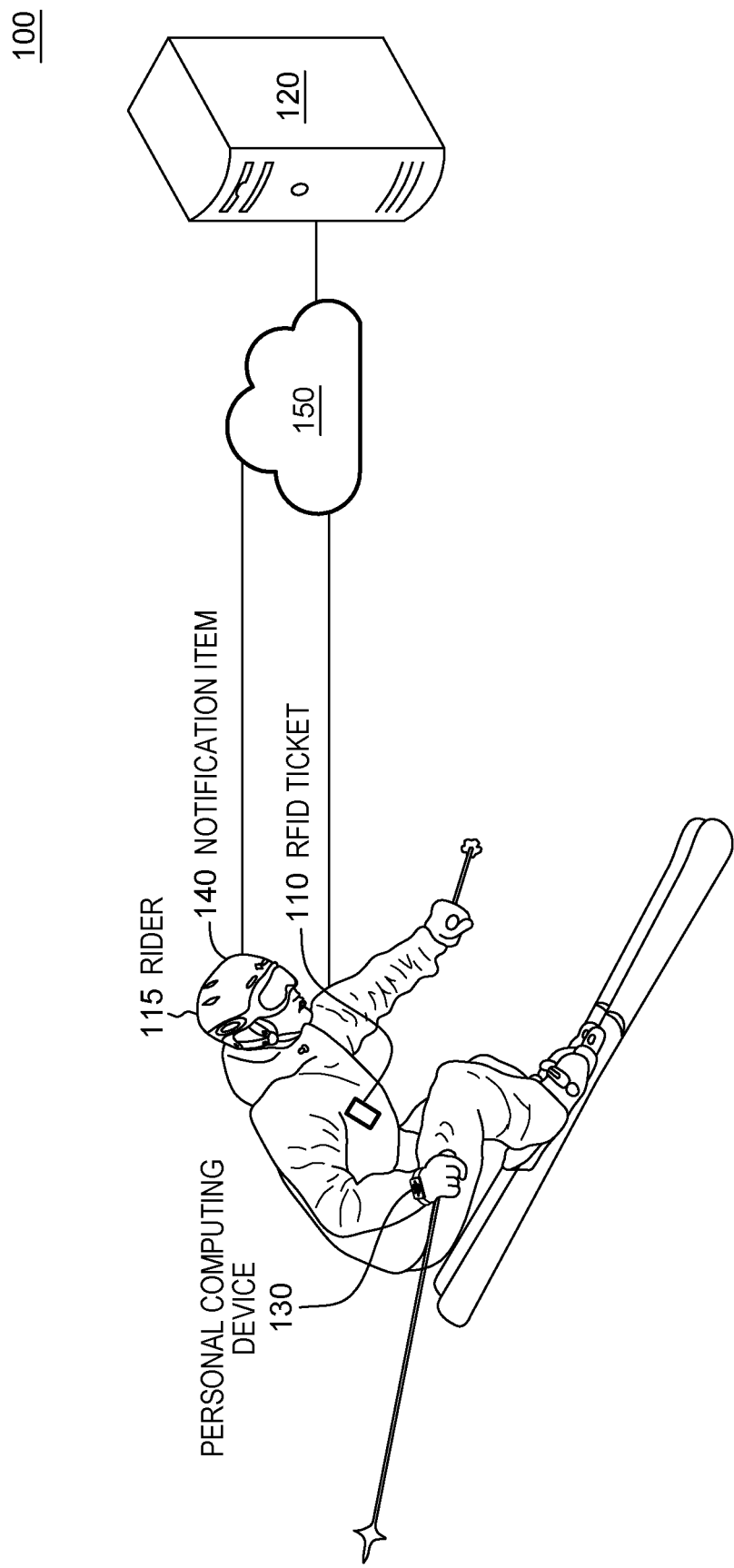
FIG. 1 is a technical environment into which certain aspects of an embodiment of the present invention can be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
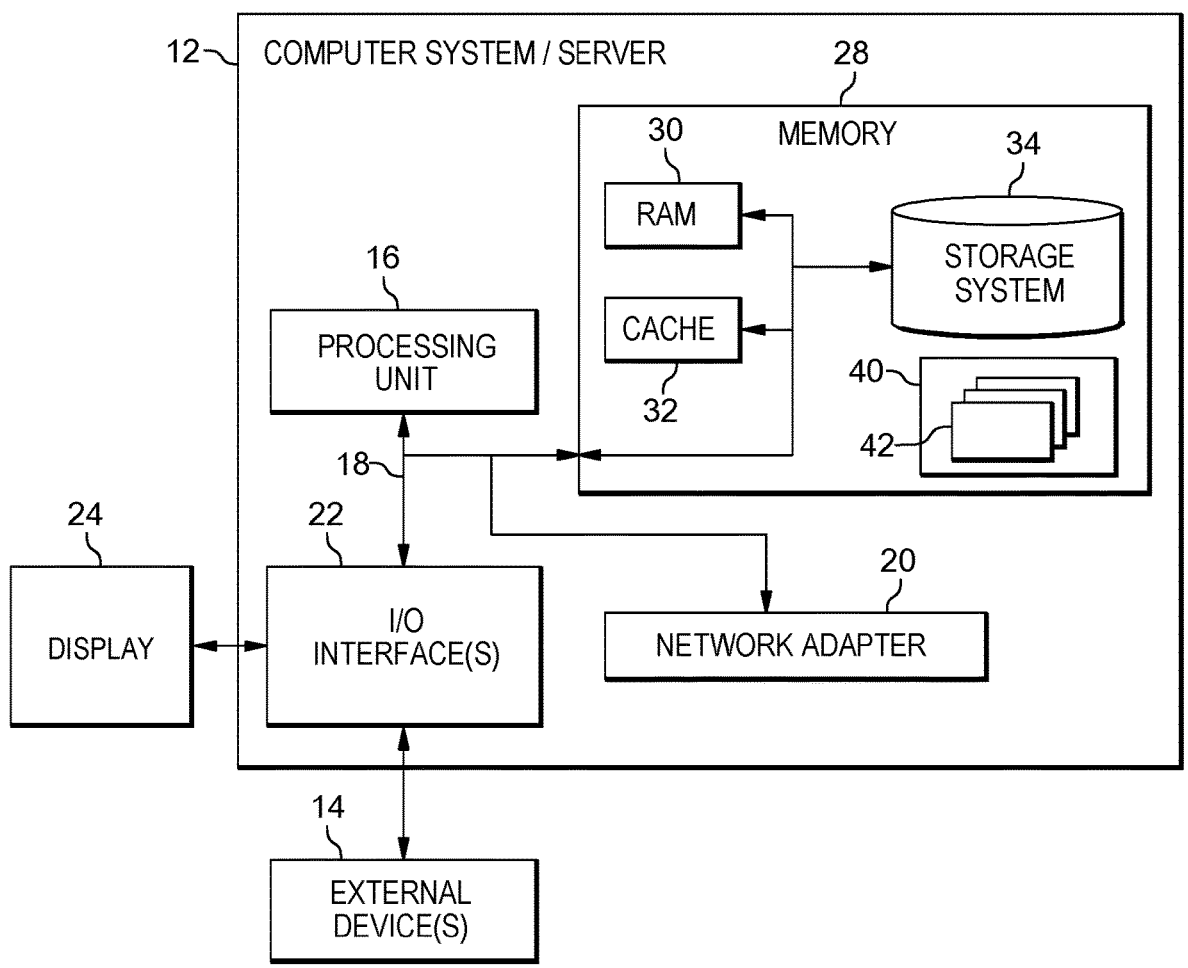
FIG. 5 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 5 as program/utility 40, having a set (at least one) of program modules 42, may be stored in memory 28.

Embodiments of the present invention include a computer-implemented method, a computer program product, and a computing system where program code executing on one or more processors tracks a position of a rider on a mountain and transmits route guidance to the rider, including what lift to take and what trail to utilize from atop the recommended lift. In embodiments of the present invention, the program code bases this guidance on both a user profile and ski area-specific data. To provide route guidance to a rider, in some embodiments of the present invention, the program code: 1) accesses a rider's Internet of Things device(s) (e.g., a radio frequency identification (RFID) ticket, a signal or image of decodable indicia, an application of a personal computing device, etc.) to monitor diagnostic data and location data related to the rider; 2) tracks the rider's position relative to landmarks in the ski area (trails, lifts, etc.); 3) machine learns a profile of the rider, based on cognitively analyzing the rider's trail selection tendencies, average speed, frequency of stops, etc., to learn the rider's proficiency; and 4) determines timing patterns related to wait times and usage of the landmarks (e.g., lifts, trails) in the ski area (trails, lifts, etc.) to predict current and future wait times and anticipated usage of the landmarks.

Although aspects of the present invention are discussed as being utilized at a ski resort and/or an alpine recreation area, by a rider. As understood by one of skill in the art, aspects of embodiments of the present invention can be implemented in various physical environments with a variety of choices of landmarks in order to maximize usage of the environment and minimizing waits on elements that provide transportation to the activities that a user paid to participate in. For example, aspects of the present invention can be implemented at amusement parks, summer recreation destinations (hiking, mountain biking, etc.), etc. The examples provided herein are limited to alpine recreation areas in order to provide an illustrative example implementation, not to limit the usability of aspects of embodiments of the present invention to a specific physical environment.

As discussed above, in embodiments of the present invention, program code executing on one or more processors, accesses a rider's IoT device to monitor diagnostic data and location data related to the rider. However, as will be discussed herein, in embodiments of the present invention, the program code accesses and analyzes data from a variety of IoT devices, including data available from various IoT devices associated with riders at a physical location (i.e., a ski resort), as well as data from IoT devices associated with various locations at the physical location. As understood by one of skill in the art, the Internet of Things (IoT) is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to an object, including but not limited to, temperature and humidity. As will be discussed herein, images and signals of decodable indicia, including, but not limited to, RFID tags, embedded in lift tickets (which enable a user to utilize lifts at the ski resort), are among the IoT devices utilized by some embodiments of the present invention. These smart sensors can be utilized to measure temperature, humidity, vibrations, motion, light, pressure, and/or altitude. IoT devices also include individual activity and fitness trackers, which include (wearable) devices or applications that include smart sensors for monitoring and tracking fitness-related metrics such as distance walked or run, calorie consumption, and in some cases heartbeat and quality of sleep and include smartwatches that are synced to a computer or smartphone for long-term data tracking. Because the smart sensors in IoT devices carry unique identifiers, a computing system that communicates with a given sensor can identify the source of the information. Within the IoT, various devices can communicate with each other and can access data from sources available over various communication networks, including the Internet.

Aspects of various embodiments of the present invention are inextricably tied to computing. Aspects of various embodiments of the present invention also provide significant advantages over existing technologies that serve to enhance the riding experience of individuals at a ski resort partaking in recreational activities accessed via a lift.

First, aspects of various embodiments of the present invention are inextricably tied to computing at least because certain functionalities of the program code described herein utilize IoT devices and machine learning in order to provide customized route recommendations to riders. The utilization of the program code in embodiments of the present invention of data available on the IoT devices, as well as the connectivity of these devices over the Internet, enables the program code both to build a user profile capturing and determining predicted behaviors of each user, as a rider, to determine an efficient recommendation of a route for the rider, taking into consideration the location of the rider (based on IoT device data), the proficiency of the rider, and route tendencies based on a machine-learned profile. Embodiments of the present invention are also inextricably linked to computing because program code in embodiments of the present invention determines a route recommendation based on the technical architecture of a computing system and its connectivity to other devices, including, potentially a cloud computing node. It is, in part, based on this computing infrastructure that the program code is able to provide contemporaneous route guidance to a rider, who is engaged in riding when receiving the guidance and seeks to act on the guidance when notified. Because of the interconnectivity of the components of the computing environment, the program code can access and analyze various types of data, such as personal and general venue-related data to provide real-time route guidance to a rider.

Second, embodiments of the present invention provide various advantages over existing rider experience enhancement approaches. In some existing approaches, program code accesses social media and weather data to provide updated conditions to riders, but these approaches do not track a rider's position on a mountain and analyze diagnostic data to provide timely notifications for personalized optimal routes (lifts, trails) that reduce wait time for the rider. Some existing approaches may utilize map data, global positioning data, and even augmented reality glasses to provide real-time route guidance across a mountain trail, including providing alternative routes based on a rider's speed, upcoming terrain type, skill level, weather, and relevant social media content. Some embodiments of the present invention provide significantly more than this approach allows because in these embodiments, program code utilizes a rider's personal diagnostic data (along with historic data), current data detailing open landmarks (trails and lifts), and the location and diagnostic data of other riders on the same mountain to determine an optimal route for the rider and to notify the rider of that route. An optimal route will enable the rider to get to a lift and back up the mountain in a fastest amount of time, maximizing the number of times the rider can traverse the mountain within the interval allowed by a ski ticket purchased by the rider. Another existing approach provides a hiker with route information based on the location of the hiker. However, aspects of embodiments of the present invention provide significantly more than this approach because guidance provided by these aspects is personalized, as user data is analyzed by the program code in embodiments of the present invention, which enables the program code to customize guidance provided to a user. Yet another existing approach selects a defined tour of a mountain for a user based upon the user's indicated ability level and provides a visible map to the user as the user navigates the tour. But unlike embodiments of the present invention, this existing approach does not provide real-time route guidance to a user for the purpose of minimizing the amount of time the user spends waiting for lifts.

For ease of understanding, throughout this disclosure, the example of an RFID lift ticket or tag is utilized as a mechanism to identify a given rider in an alpine recreation area as well as a mechanism to provide a location of the rider and to track the movements of the rider, in some circumstances. As understood by one of skill in the art, as RFID ticket is one example of such an identifying and locating device that can be utilized to identify a user in a physical space. This example is used throughout for illustrative purposes only and does not suggest any limitations to the implementation of various aspects of the present invention. Thus, even when an RFID ticket and when an RFID reader are referenced, one of skill in the art will recognize that the same aspects of the present invention can be implemented using different technologies that provide and/or read images or signals of decodable indicia or other identifiers. For example, some embodiments utilize technological items, including, but not limited to, the following, in place of or in addition to, RFID, in embodiments of the present invention: a signal of decodable indicia, an image of decodable indicia, a barcode, an encoded image, an image, a subscriber identification module (SIM) card, an/or any device that stores an international mobile subscriber identity (IMSI) number and its related key.

As discussed above, in embodiments of the present invention, program code provides personalized route guidance to riders in an alpine recreation area (e.g., ski resort, mountain, mountain range, ski area, etc.) in order to maximize the time the riders spend recreating and minimize the amount of time the riders spend awaiting lifts to recreate. FIG. 1 includes an illustration of a technical environment 100 into which various aspects of the present invention can be implemented. FIG. 1 provides an overview of certain hardware and software utilized in certain embodiments of the present invention, the functionality of which will be discussed in greater detail herein.

In some embodiments of the present invention, program code executing on at least one computing device 120 accesses signals or images of decodable indicia, including but not limited to, lift tickets with embedded RFID tags 110 (i.e., RFID lift tickets), over a network 150 (e.g., private, public, and/or the Internet) to track locations of riders 115 associated with the RFID lift tickets 110, in an alpine recreation area. Although existing RFID ticket systems utilize passive RFID in the tickets, embodiments of the present invention can accommodate both passive and active RFID lift tickets 110. Program code in embodiments of the present invention can access RFID lift tickets 110 in existing RFID ticketing systems, which utilize passive RFID tags in tickets with ultra high frequency (UHF) transponders. In some embodiments of the present invention, the signals of decodable indicia (of which RFID, as discussed above, is one example, offered for illustrative purposes only) that are identifiers for various riders, rather than representing a pass for a specific period of time during a given day or week (e.g., long term or short term lift ticket), can include special passes, such as season passes or employee passes.

In general, riders 115 in alpine recreation areas carry RFID lift tickets 110 on their persons and these RFID tickets 110 enable the riders 115 to pass to utilize the lifts secured by the gates. In some cases, employees hold scanners and these employees scan the tickets of the riders before allowing them to board lifts. Returning to the fate example, in some alpine recreation areas, to access each lift, a rider moves through a gate, which opens when program code at the gate, which may be part of the integrated hardware of the gate, scans and validates the RFID ticket 110 of a rider 115. If the rider's RFID ticket 110 is invalid or a rider 115 does not have a ticket 110, the gate will not open, and the rider cannot access the lift. Program code in embodiments of the present invention can also monitor riders based on personal computing devices 130 utilized by the riders 115, which can provide the program code with diagnostic information about the riders 115. These personal computing devices 130 can include, but are not limited to, IoT devices, goggles, gyroscopes, accelerometers, various sensors to track a rider's speed, GPS position, altitude, and/or personal fitness trackers. In some embodiments of the present invention, the personal computing devices 130 utilized by the riders 115 execute a mobile device application, which enables the program code to access these personal computing devices 130. In some embodiments of the present invention, the rider utilizes the mobile device application to access the position data of other riders' at the alpine recreation area and information about currently open trails and currently operating lifts at the recreation area. This current operating information about lifts can include, but is not limited to, the number of riders that can fit on a single chair, gondola, etc., number of chairs, speed of the lift, past data about how often it is stopped (e.g., because a rider fell getting on or off), etc. In embodiments of the present invention, program code provides personalized route guidance to a rider that minimizes the rider's wait time, based on one or more of the following factors: a rider's diagnostics, current position, anticipated time for the rider to reach accessible lifts, lift diagnostic data, and/or anticipated positions of other riders at relevant times. The program code can provide this guidance, via the network 150, to a rider through various computing devices utilized by the rider, and in various formats, through one or more notification items 140, including but not limited to: 1) providing a visual alert utilizing Heads Up Display (HUD) goggles; 2) providing an audio alert through wired or wireless headphones; 3) providing an audio alert through wireless speakers in a rider's helmet; and//or 4) providing a visual or audio alert through an interface of the rider's personal computing device 130.

Figure 2:
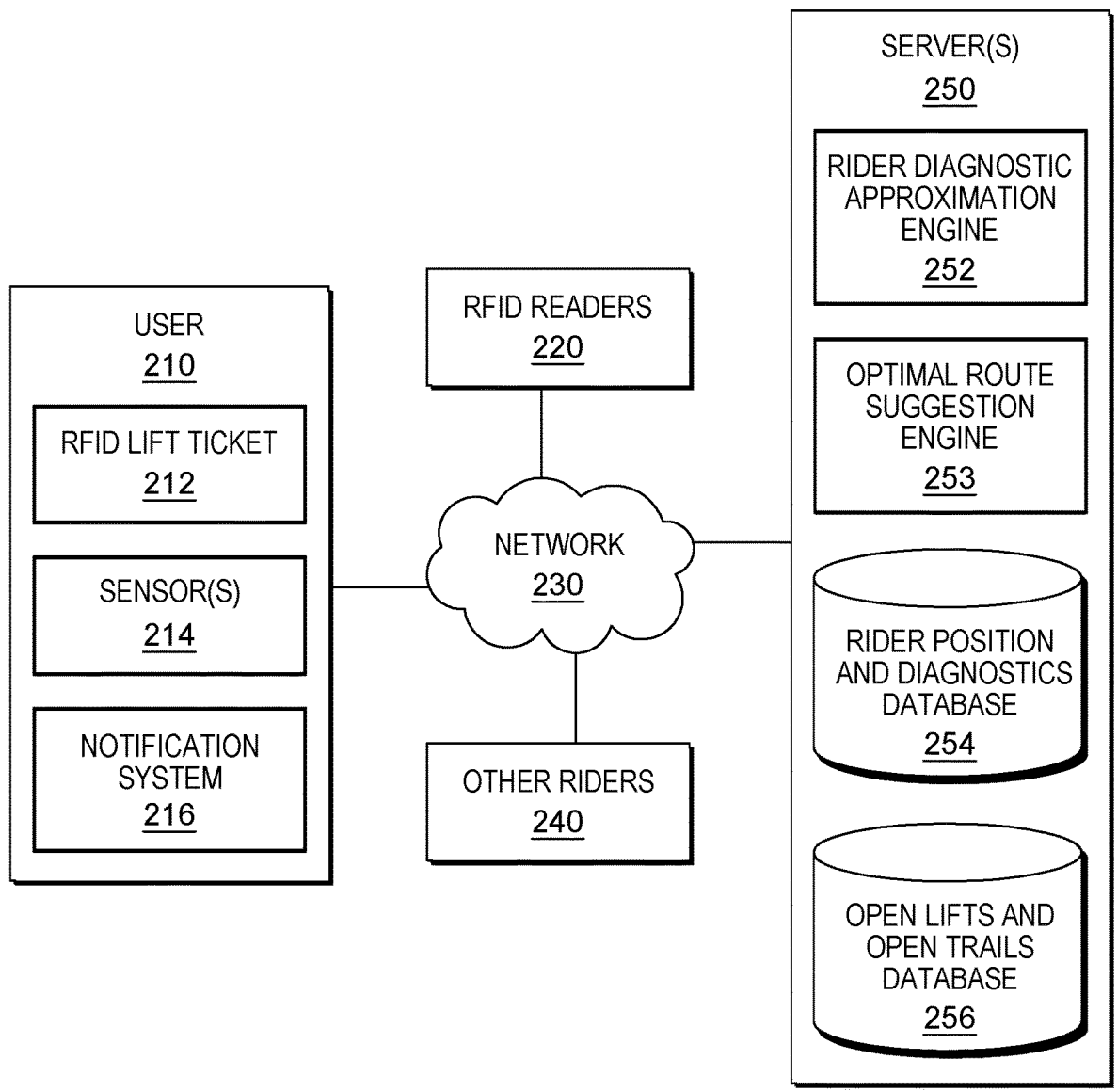
FIG. 2 is an environment into which certain aspects of an embodiment of the present invention can be implemented.

FIG. 2 is an environment 200 into which certain aspects of some embodiments of the present invention are implemented. This environment 200 includes computing systems as well as individuals who can be associated with certain computing systems. The environment 200 includes a user 210 (i.e., a rider), who is used as a specific example. There are other users 240 in the environment 200 as well, although in this example, they do not utilize all the same computing devices as the exemplary user 210. However, these users 240 can utilize identical computing devices as the user 210, but for the sake of simplicity in FIG. 2, the devices of the user 210, only, are detailed. The environment 200 also includes RFID readers 220 and one or more servers 250 that communicate via a wired and/or wireless network, which can be a public and/or private network, including the Internet.

As discussed in reference to FIG. 1, program code executing on the one or more servers 250 monitors the user 210, both to track the location of the user 210 within an alpine recreation area, and to collect diagnostic data related to the user 210. In some embodiments of the present invention, the program code accesses an RFID lift ticket 212 of the user 210, and determines, based on a location of the RFID lift ticket 212, the location of the user 210 in the alpine recreation area. The program code collects additional data about the user 210 by accessing sensors 214 associated with the user. The sensors 214 can include, but are not limited to, a GPS transmitter, an accelerometer, a gyroscope, and an altitude sensor. These sensors 214 can be included within the user's mobile device or integrated into wearable technology, including a helmet and/or goggles. The user 210 in this environment 200 also carries and/or wears a computing device that acts as a notification system 216. The notification system 216 can include one or more of: a visual notification system (e.g., HUD goggles, the graphical user interface of a mobile device), an audio notification system (e.g., speakers within a helmet, an audio output of a mobile device). Each of the additional riders 240 in the environment 200 also carries an RFID lift ticket (issued by the alpine recreation area). The RFID readers 220, which are positioned in various locations in the alpine recreation area, read the positions of the user 210, as well as the positions of the additional riders 240, utilizing the alpine recreation area, by reading the RFID lift tickets. The RFID readers 220 can be placed along divergent paths in the alpine recreation area. In some embodiments, the RFID readers 220 may be placed in close enough proximity such that riders are always within proximity of at least three readers such that their exact position can be triangulated.

Program code executing on the one or more servers 250 recommends an optimal route to the user 210, which is customized to the abilities of the user 210, and minimizes the wait time of the user 210. In some embodiments of the present invention, when the program code determines that there are multiple paths to a lift at the user's skill level that will take the same amount of time, the program code can recommend a trail with the least amount of clutter (e.g., number of other riders, snowmaking equipment, lessons in progress, etc.).

For ease of understanding and illustrative purposes only, certain of the aspects of the program code executing on the server(s) 250 are separated into modules or engines. As understood by one of skill in the art, these aspects can be combined and separated into one or more programs or applications, depending upon the embodiment. As depicted in FIG. 2, the program code executing on the server(s) 250 comprises a rider diagnostic approximation engine 252, an optimal route suggestion engine 253, a rider position and diagnostic database 254, and an open lifts and open trails database 256. Program code in the rider diagnostic approximation engine 252 utilizes data obtained by the program code from the sensors 214 and/or RFID lift ticket 212 of the user 210 to generate a user profile that includes user 210 behavioral patterns, including but not limited to, trail selection tendencies, average speed on each trail, how often the user 210 stops for breaks, how often the user 210 falls, preferred lifts, etc. The program code can also include in the user profile personal diagnostics obtained from the sensors 214, for example, if the sensors 214 include biometric sensors. In some embodiments of the present invention, an optimal route can be customized by the program code also based on the rider type, for example, whether the user is a casual vacationer or a member of the medical personnel working on the mountain. The program code can reserve truly optimal routes for medical personnel so that they can reach hurt/injured riders more quickly and get these riders down to the base/medical station more quickly. Thus, the program code can refrain from suggesting certain routes to casual riders in order to keep these routes clear for medical personnel.

Figure 3:
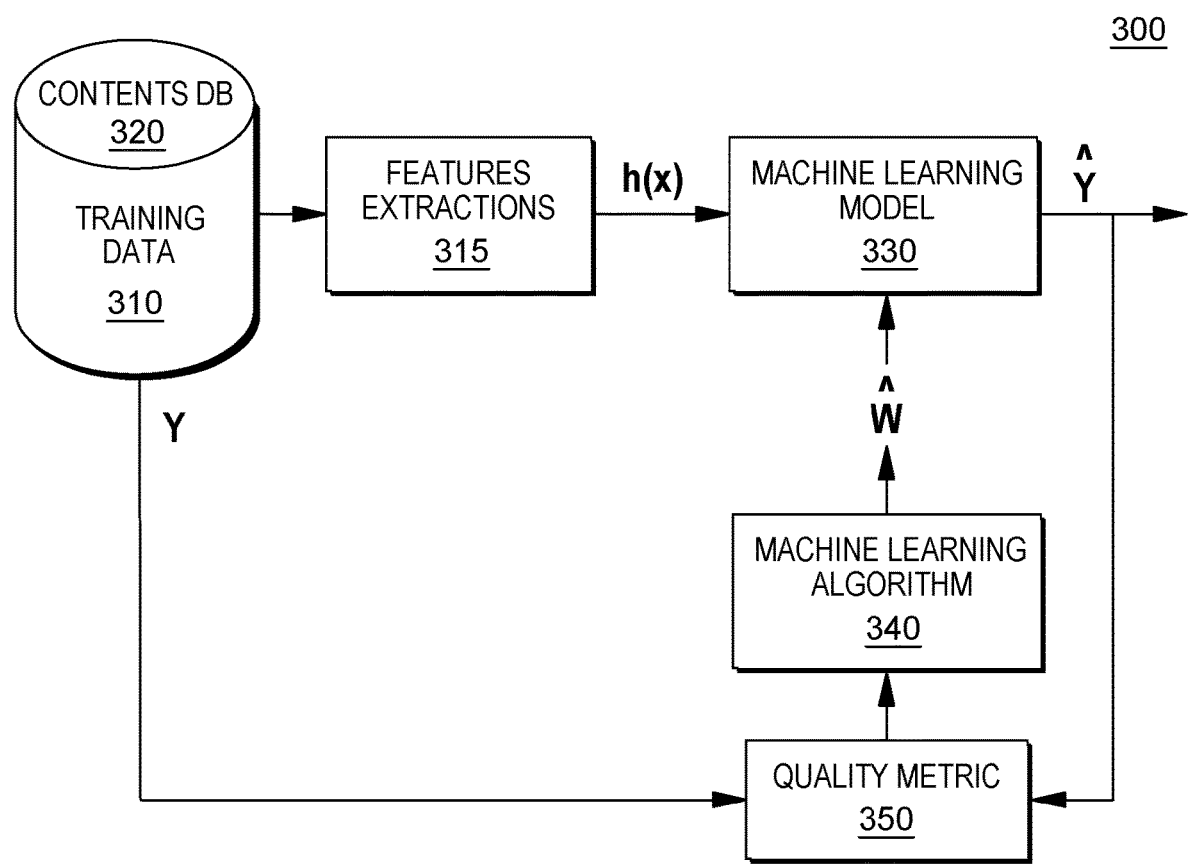
FIG. 3 is an illustration of various aspects of an embodiment of the present invention.

In embodiments of the present invention, program code executing on the server(s) 250 can machine learn from user 210 data, generate a rider profile of the user 210, and utilize the user profile stored on database 254 and open lifts and trails database 256 to predict a location of a user 210 at a future point in time. In some embodiments of the present invention, the program code applies machine learning algorithms to generate and train algorithms (a rider profile for a user) based on data obtained by the program code from the sensors 214. The program code can train these algorithms, based on patterns the program code identifies in the data obtained from the user 210. FIG. 3 is an example of a machine learning training system 300 that can be utilized to perform cognitive analyses of user data, referred to herein as diagnostic database 254, to generate a rider profile for the user. Machine learning (ML) solves problems that cannot be solved by numerical means alone. In this ML-based example, program code extracts various features/attributes from training data 310 (e.g., data collected from the sensors 214 (FIG. 2) over a given period of time, which may include historical data). The features are utilized to develop a predictor function, h(x), also referred to as a hypothesis, which the program code utilizes as a machine learning model 330. In identifying various attributes of a user 210 (FIG. 2) to determine the user's proficiency as a rider, by analyzing the training data 310, the program code can utilize various techniques including, but not limited to, mutual information, which is an example of a method that can be utilized to identify features in an embodiment of the present invention. Further embodiments of the present invention utilize varying techniques to select features (elements, patterns, attributes, etc.), including but not limited to, diffusion mapping, principal component analysis, recursive feature elimination (a brute force approach to selecting features), and/or a Random Forest, to select the attributes. The program code may utilize a machine learning algorithm 340 to train the machine learning model 330 (e.g., the algorithms utilized by the program code, the user's rider profile), including providing weights for the conclusions, so that the program code can determine a future location of a user 210 (FIG. 2), based on a user's proficiency as a rider, in accordance with the predictor functions that comprises the machine learning model 330. The conclusions may be evaluated by a quality metric 350. By selecting a diverse set of training data 310, the program code trains the machine learning model 330 to identify and weight various attributes (e.g., features, patterns) that correlate to user behaviors that form the user's rider profile.

In some embodiments of the present invention, the program code utilizes a neural network (NN) to analyze the diagnostic data obtained by the program code from the sensors 214 (FIG. 2). Neural networks are a biologically-inspired programming paradigm which enable a computer to learn from observational data, in this case, diagnostic data collected by the sensors 214 (FIG. 2). This learning is referred to as deep learning, which is a set of techniques for learning in neural networks. Neural networks, including modular neural networks, are capable of pattern (e.g., topic) recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns (e.g., attributes of a user profile) in data (i.e., neural networks are non-linear statistical data modeling or decision-making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in data modeling, which the program code in embodiments of the present invention accomplishes as part of the program code cognitively analyzing data collected by the sensors 214 (FIG. 2).

Some embodiments of the present invention may utilize a neural network (NN) to predict locations of a user 210 (FIG. 2) at various times in the future, based on the generated proficiencies of the user 210 as a rider. Utilizing the neural network, the program code can predict the likelihood of a user 210 (FIG. 2) reaching a given destination in an alpine recreation area, at a given time in the future. Given that minimizing the wait time of a given user is reliant, in part, upon locations (and proficiencies) of other riders 240 (FIG. 2), The program code program code obtains (or derives) the initial locations of the user 210 (FIG. 2) and the riders 240 (FIG. 2) to generate an array of values (possible locations) to input into input neurons of the NN. Responsive to these inputs, the output neurons of the NN produce an array that includes the predicted locations.

In some embodiments of the present invention, a neuromorphic processor or trained neuromorphic chip can be incorporated into the computing resources executing the program code. One example of a trained neuromorphic chip that is utilized in an embodiment of the present invention is the IBM® TrueNorth chip, produced by International Business Machines Corporation. IBM® is a registered trademark of International Business Machines Corporation, Armonk, N.Y., U.S.A. Other names used herein may be registered trademarks, trademarks or product names of International Business Machines Corporation or other companies.

The IBM® TrueNorth chip, also referred to as TrueNorth, is a neuromorphic complementary metal-oxide-semiconductor (CMOS) chip. TrueNorth includes a manycore network on a chip design (e.g., 4096 cores), each one simulating programmable silicon "neurons" (e.g., 256 programs) for a total of just over a million neurons. In turn, each neuron has 256 programmable synapses that convey the signals between them. Hence, the total number of programmable synapses is just over 268 million ($2^{28}$). Memory, computation, and communication are handled in each of the 4096 neurosynaptic cores, so TrueNorth circumvents the von-Neumann-architecture bottlenecks and is very energy-efficient.

Returning to FIG. 2, in some embodiments of the present invention, the program code retains a temporary position of all riders, including the user 210 and the additional riders 240, on the mountain, in a rider position and diagnostic database 254. The program code also retains results generated by the program code of the rider diagnostic approximation engine 252, in this database. Also located at the server(s) 250, in this embodiment of the present invention, is an open lifts and open trails database 256, which the program code can update at various set intervals (e.g., daily, hourly, etc.) which provides data regarding which elements of the alpine recreation area are operational, including trails and lifts. The program code can obtain updated operational data from public sources, including but not limited to, the website of the alpine recreational area. In some embodiments of the present invention, the program code obtains this data via a service.

Once the program code determines an optimal route for a user 210 (e.g., the optimal trails to take that will get the user 210 to a lift and back up the mountain the fastest such that the user 210 can get more runs in for the day and get the most value out of the user's ticket), based on the rider profile as well as the positions of other riders 240, based on the other riders' RFID lift ticket data, as recorded by the RFID readers 220, the program code of the optimal route selection engine 253 relays the optimal route information to the user 210. The user 210 receives the data via a notification system 216.

Figure 4:
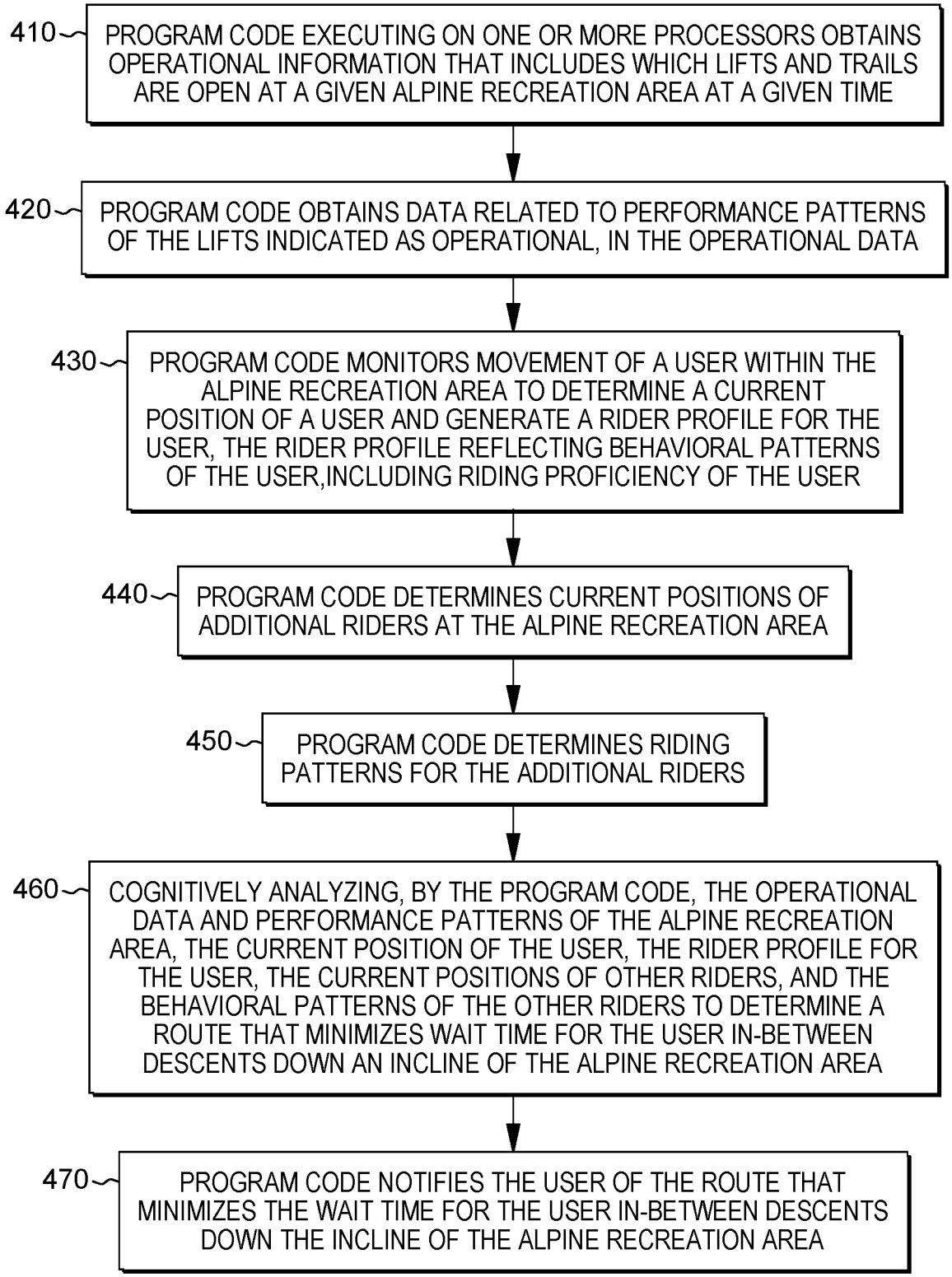
FIG. 4 is a workflow illustrating various aspects of an embodiment of the present invention.

FIG. 4 is a workflow 400 that illustrates various aspects of some embodiments of the present invention. In an embodiment of the present invention, program code executing on one or more processors obtains operational information that includes which lifts and trails are open at a given alpine recreation area at a given time (410). In given time can be an interval during which lift tickets purchased by riders are valid. In some embodiments of the present invention, the program code continually updates the operational information, such that it remains current. The program code can obtain this data from a variety of sources, including but not limited to, a system or server operated by the alpine recreation area, a third-party application, a checklist that the user can select from manually, and/or via image analysis of a picture taken of the alpine recreation area taken from an image capture device.

The program code obtains data related to performance patterns of the lifts indicated as operational, in the operational data (420). In some embodiments of the present invention, the performance patterns are provided by historical data from an external source. Operational data for a given lift can include, but is not limited to, the speed of the lift, how often it is stopped, an average length of stops, including a standard deviation, the availability of different types of lines to the lift (e.g., singles line, group lines (doubles, triples, etc.), lines reserved for priority members, lines reserved for personnel, etc.), and/or an average frequency and standard deviation related to how often personnel or medical staff cut the line.

In some embodiments of the present invention, the program code monitors movement of a user within the alpine recreation area to determine a current position of a user and generate a rider profile for the user, the rider profile reflecting behavioral patterns of the user, including riding proficiency of the user (430). The program code determines a position of the user at each point in time using one or more of location services on a personal computing device of the user and/or reading an RFID lift ticket associated with the user, via a reader at a location proximate to the user at the alpine recreation area. Utilizing the location services on a personal computing device, the program code can obtain the user's speed, GPS position, altitude, etc. The program code utilizes this data to determine a current location of the user. The program code machine learns the profile of the rider, based on cognitively analyzing the monitored data, including the user's trail selection tendencies, average speed, frequency of stops, etc., to generate a profile reflecting a proficiency of the user at riding.

The program code determines current positions of additional riders at the alpine recreation area (440). In some embodiments of the present invention, utilizing the RFID lift ticket of the user, the program code can obtain not only the position of the user, but also positions of additional riders at the alpine recreation area. In addition to providing RFID readers at the entrances to lifts in an alpine recreation area, to provide an accurate location for users, an alpine recreation area can also install RFID readers along trails on the mountain. If the user is within range of at least three RFID readers, the program code can triangulate the exact position of the user. If the user is in range of less than three RFID readers, the general location of said user can be approximated based on the RFID readers; scanning range and the duration that the user is within the scan range. The program code can obtain a distance from an RFID reader by sending a signal (e.g., ping) and monitoring the time that the program code takes to receive a return signal. In some embodiments of the present invention, the program code can utilize Friis transmission equation to determine the distance. The program code utilizes the position data of riders not only to determine whether certain operational trails are crowded (which would affect the speed of the user in navigating the trail), but, also, to determine how long the lines are at each lift, to determine wait time for the user.

In some embodiments of the present invention, image capture devices located at various positions at the alpine recreation area capture images of users, which the program code analyzes both to recognize specific users and to determine their locations and to determine crowd size at various lifts and on trails at the alpine recreation area. Based on the locations of the various identified users, the program code can infer the ability levels of these users, which the program code can utilize in recommending an optimal route (e.g., the program code would not be recommending an optimal route by urging a beginner level rider to take a trail to a lift that only services expert level terrain). The image capture devices can recognize specific users based on distinctive features, including but not limited to, items of clothing.

In some embodiments of the present invention, the program code determines riding patterns for the additional riders (450). In some embodiments of the present invention, the program code accesses historical data related to an additional rider, for example, via a personal computing device of the rider, or via a season pass that is an RFID lift ticket. If historical data is not available, the program code can monitor the additional riders via one or more of RFID lift tickets scanned by RFID readers, personal computing devices, stationary image capture devices at various locations in the alpine recreation area, to machine learn riding patterns of the riders. These patterns can include, but are not limited to, trail selection tendencies, average speed on each trail, how often the rider stops for breaks, reasons for breaks (based on biometrics or image-captured social reasons), how often the rider falls, and/or preferred lifts.

The program code proceeds by cognitively analyzing the operational data and performance patterns of the alpine recreation area, the current position of the user, the rider profile for the user, the current positions of other riders, and the behavioral patterns of the other riders to determine a route that minimizes wait time for the user in-between descents down an incline of the alpine recreation area (460). The program code utilizes the operational data to determine possible trails and lifts that can be included in the route, provided that they meet the time requirements. The program code utilizes the performance patterns of the lifts when calculating the timing of different route possibilities. The program code utilizes the current position of the user and the rider profile for the user to predict the timing of various routes and to determine whether to exclude certain routes, based on levels of difficulty exceeding the ability level of the rider, per the profile. Predicting the timing of the user's navigation of a route is relevant because the crowds at various locations, including those that could be recommended, can change over time. If a user is recommended a certain route because the lift is anticipated to have a light wait for the next five minutes, if based on the behavioral patterns and proficiency of the user modeled in the user profile, the program code determines that the user will not reach the lift for ten minutes, including the lift in the recommended route may not be useful or correct. The program code utilizes the current positions of other riders and the behavioral patterns of the other riders to predict crowds (or lack of crowds) at various locations of each possible route, and to anticipate the impacts of these crowds on the timing of the user.

In cognitively analyzing data related to the other riders, the program code can predict the location of these riders at future points in time and anticipate how these predicted locations will affect the timing of the descent of the initial user. For example, the program code can determine an approximate position of all other riders at the times that the user will reach each lift. Additionally, the program code can utilize diagnostic information of the other riders to predict which trail these users may take, in order to determine future crowd size at various lifts to which the program code may direct the user. For example, if a given rider is midway down a trail and the rider comes to a point where the rider can take a difficult black diamond trail or an intermediate blue trail that both lead to different lifts and that user has been on beginner green trails and intermediate blue trails all day, the program code can predict that the user will not take the difficult black diamond trail at this time.

In some embodiments of the present invention, the program code can determine a route for a group of users, rather than for a single user. For example, based on monitoring riders, utilizing one or more of the RFID lift tickets, personal computing devices, RFID readers, and/or image capture devices, the program code determines that a given user requesting a route, or for whom the program code is automatically calculating a route, is with one or more additional riders. The program code can determine the lowest proficiency level and anticipated speed for a rider in the group and generate a recommended route based on factors related to this rider, rather than the initial user, because the initial user's speed and ability to navigate trails will be affected by being in the company of the less proficient rider.

Returning to FIG. 4, upon determining the route, the program code notifies the user of the route that minimizes the wait time for the user in-between descents down the incline of the alpine recreation area (470). By providing the route guidance to the user, the program code enables the user to get more runs in for the day and get the most value out of the lift ticket. As discussed above, the program code can notify the user through various interfaces, including but not limited to, via HUD goggles, via augmented reality directions within HUD goggles, via speakers located within the user's helmet, on a GUI of a mobile application executing on a personal computing device of the user.

Depending on the implementation of aspects of embodiments of the present invention, the frequency and the impetus for the program code providing guidance can vary. For example, in some embodiments of the present invention, the program code can provide guidance responsive to a request from the user, via a personal computing device. In some embodiments of the present invention, the program code may receive a notification that an RFID lift ticket has been read at the entrance to a given alpine recreation area and can provide guidance intermittently (e.g., at pre-defined fixed intervals) to the user associated with the RFID lift ticket. In some embodiments of the present invention, the program code provides the guidance continuously to the user.

Embodiments of the present invention include a computer-implemented method, a computer program product, and a computer system, where program code executing on one or more processors monitors movement of users within a physical environment, where the physical environment comprises a plurality of routes to traverse and a plurality of transports, where each transport of the plurality of transports can be utilized by the users to reach a portion of the plurality of routes, where the physical environment further comprises one or more readers configured to read a signal or an image of decodable indicia, positioned at locations along the plurality of routes, where the monitoring comprises obtaining, from the readers, locations of the users, based on the readers accessing signals or images of decodable indicia associated with the users, when the users are within pre-defined ranges of the readers, and where the signals or the images of decodable indicia are valid for a pre-defined period of time. The program code identifies, during the pre-defined period of time, a given user of the users within the physical environment. The program code generates a movement profile for the given user, where the movement profile comprises machine learned movement patterns for the given user, based on the monitoring, where the movement profile comprises a proficiency measure for the given user at navigating the physical environment. The program code generates, based on the movement profile of the given user and the locations of the users, route guidance for the given user, where the route guidance comprises a recommendation for taking a specific route of the plurality of routes to a specific transport of the plurality of transports, where the recommendation is consistent with the proficiency measure of the given user and comprises an optimized route to minimize wait time at the plurality of transports and maximize time spent on the plurality of routes during the pre-defined period of time. The program code transmits the route guidance to the given user, such that the given user obtains the route guidance at a given location where contemporaneous with receiving the route guidance the user, based on the given location, can take the specific route.

In some embodiments of the present invention, the program code generating includes: the program code obtaining, based on the monitoring, a current location of the given user; the program code predicting, based on the movement profile for the given user, the given location of the current user, where the given location of the current user comprises an anticipated location of the user at a future time contemporaneous with the given user obtaining the transmitted route guidance; and the program code generating the guidance based on the given location of the current user.

In some embodiments of the present invention, the program code transmitting further includes: the program code transmitting the route guidance at the future time.

In some embodiments of the present invention, the program code obtains a request for the route guidance from the user, where the transmitting is responsive to obtaining the request.

In some embodiments of the present invention, the program code identifying the given user includes: the program code obtaining, from a reader of the one or readers, an indication that a lift ticket associated with the given user is within a vicinity of the physical environment.

In some embodiments of the present invention, the program code identifying the given user includes: the program code utilizing a visual recognition device to capture an image of the given user and to identify the given user, based on the image.

In some embodiments of the present invention, the program code monitoring the movement of the users within the physical environment further comprises: the program code obtaining via personal computing devices of the users, movement data describing the movements of the users in the physical environment.

In some embodiments of the present invention, the program code generating the movement profile for the given user further comprises: the program code obtaining from the movement data describing the movements of the users in the physical environment, movement data describing movements of the given user in the physical environment; the program code identifying dependencies between factors in the movements of the given user and locations of the given user in the physical environment during the movements of the given user; and the program code generating a set of rules representing the identified dependencies, where the machine learned movement profile comprise the set of rules.

In some embodiments of the present invention, the program code obtains operational information detailing a group of transports of the plurality of transports and a group of routes of the plurality of routes accessible to the users during the pre-defined period of time, and where the specific route is selected from the group of routes and the specific transport is selected from the group of transports.

In some embodiments of the present invention, the program code generates the movement profile is additionally based on timings associated with taking the plurality of transports proximate to the future time, and the program code generating the movement profile further comprises: the program code monitoring via image capture devices positioned proximate to the plurality of transports, loading and unloading activities related to the plurality of transports; the program code retaining the loading and unloading activities as historical data; the program code calculating based on analyzing the historical data, predicted wait times and predicted transport times associated with the plurality of transports; and the program code interpolating based on the predicted wait times and the predicted transport times, the timings associated with taking the plurality of transports proximate to the future time.

In some embodiments of the present invention, the physical environment comprises an alpine recreation area, the plurality of transports comprise ski lifts, the plurality of routes comprise ski trails, and the signals or the images of decodable indicia comprise lift tickets.

In some embodiments of the present invention, the readers comprise radio frequency identification (RFID) readers and the signals or the images of decodable indicia comprise RFID cards.

In some embodiments of the present invention, the program code provides the route guidance utilizing an alert selected from the group consisting of: a visual alert and an audio alert.

In some embodiments of the present invention, the alert is the visual alert and the alert is provided via a device selected from the group consisting of: Heads Up Display (HUD) goggles of the given user and a personal computing device of the given user.

In some embodiments of the present invention, the alert is the audio alert and the alert is provided via a device selected from the group consisting of: wireless speakers in a helmet of the given user and a personal computing device of the given user.

Referring now to FIG. 5, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention server 120 (FIG. 1) and servers(s) 250 can each be understood as a cloud computing node 10 (FIG. 5) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
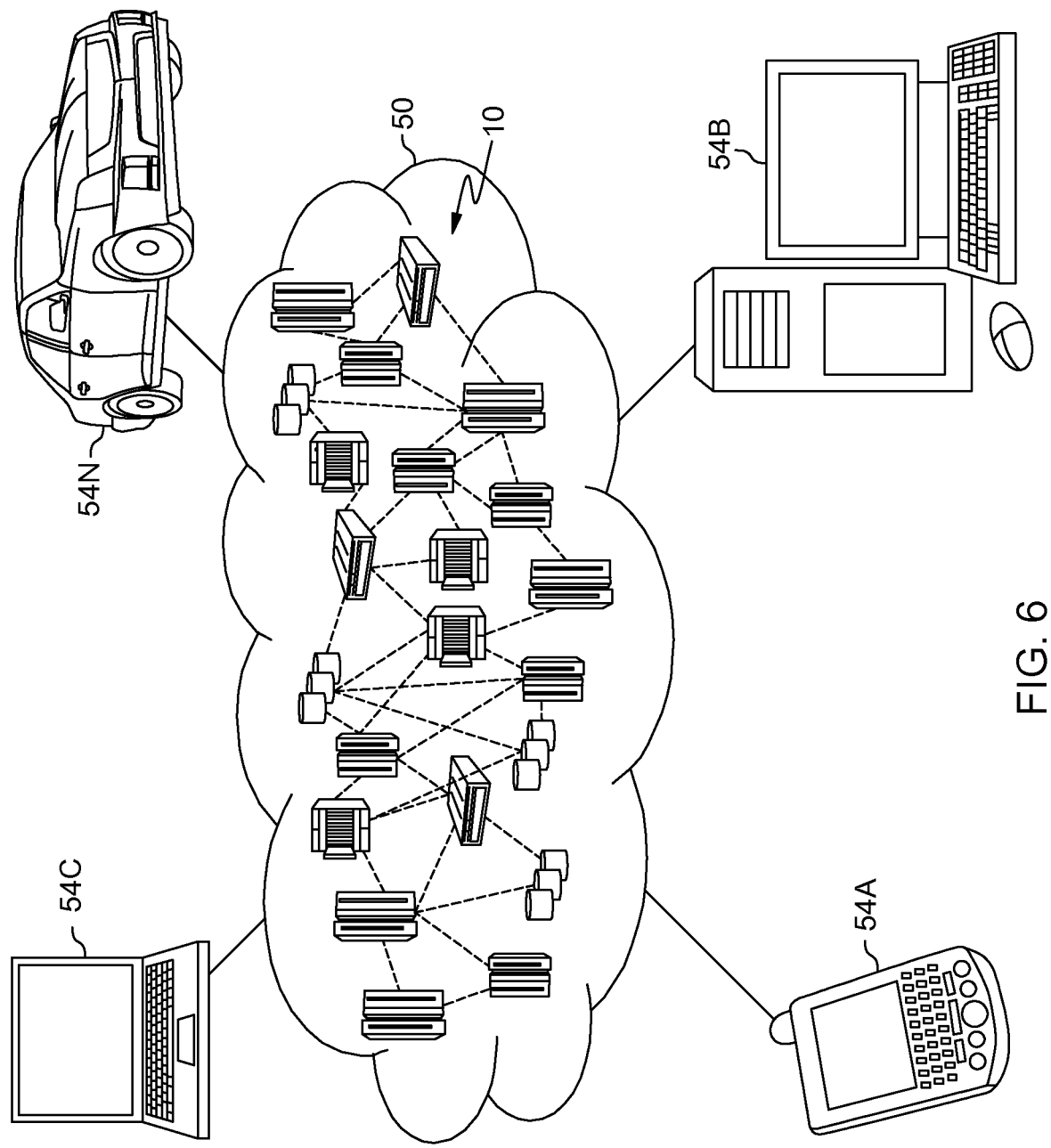
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
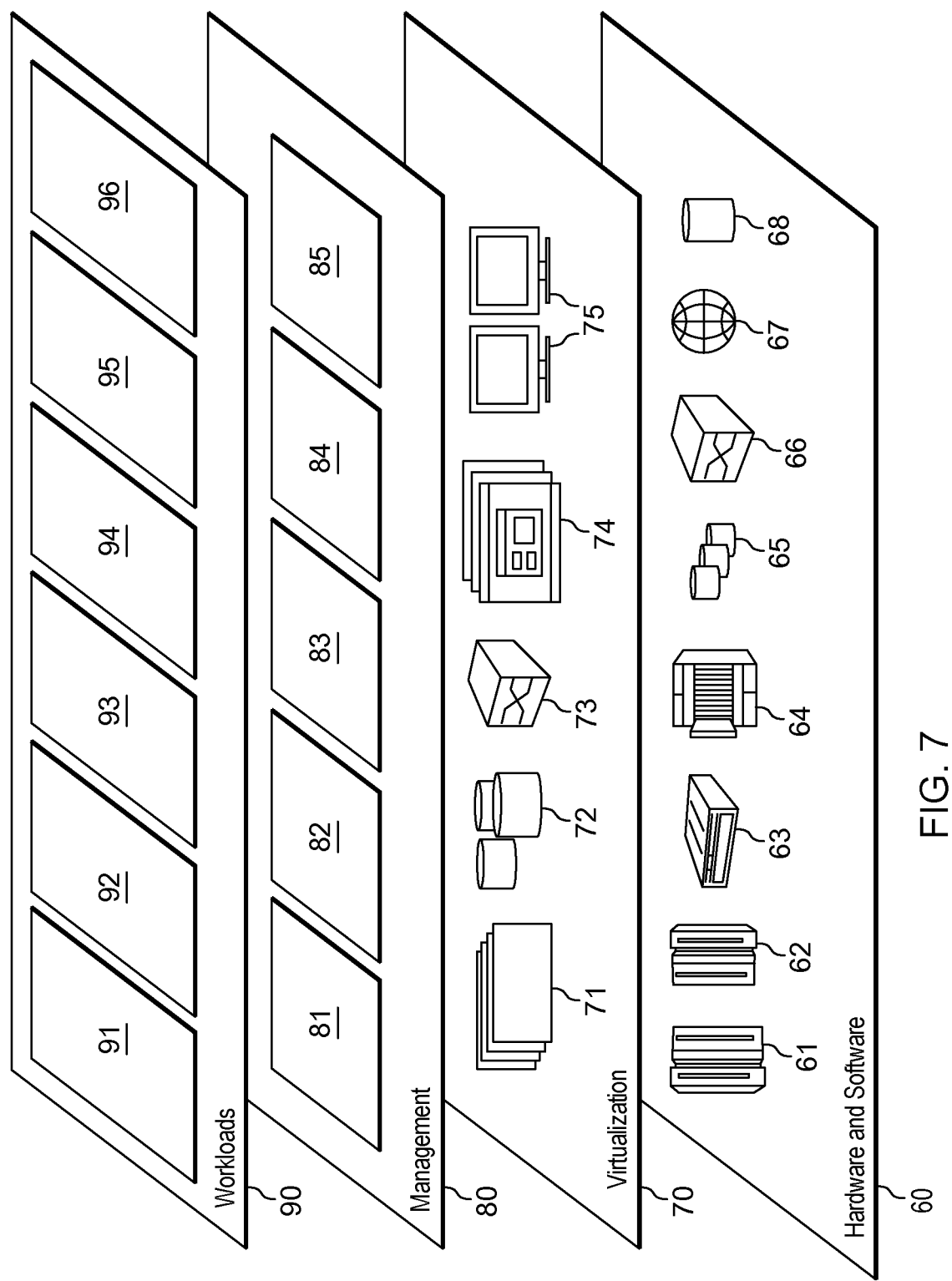
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a personalized optimal route for a user 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
monitoring, by one or more processors, movement of users within a physical environment, wherein the physical environment comprises a plurality of routes to traverse and a plurality of transports, wherein each transport of the plurality of transports can be utilized by the users to reach a portion of the plurality of routes, wherein the physical environment further comprises one or more readers configured to read a signal or an image of decodable indicia, positioned at locations along the plurality of routes, wherein the monitoring comprises obtaining, from the one or more readers, locations of the users, based on the one or more readers accessing signals or images of decodable indicia associated with the users, when the users are within pre-defined ranges of the one or more readers, and wherein the signals or the images of decodable indicia are valid for a pre-defined period of time;
identifying, by the one or more processors, during the pre-defined period of time, a given user of the users within the physical environment;
determining, by the one or more processors, based on the monitoring, that the given user is navigating the physical environment in a group comprising at least one additional user of the users;
generating, by the one or more processors, movement profiles for each user in the group, wherein the movement profiles comprise machine learned movement patterns for each user in the group, based on the monitoring, wherein each movement profile comprises a proficiency measure for each user in the group at navigating the physical environment;
identifying, by the one or more processors, a specific user in the group, wherein the specific user has a lowest proficiency measure when compared to proficiency measures of a remainder of the group, wherein the specific user is not the given user;
continuously generating, concurrently with monitoring movements of the given user in the physical environment, by the one or more processors, based on the movement profile of the specific user and the locations of the users, route guidance for the given user, wherein the route guidance comprises one or more temporal recommendations for taking one or more specific routes of the plurality of routes to one or more specific transports of the plurality of transports, wherein the one or more temporal recommendations are consistent with the lowest proficiency measure and each of the one or more temporal recommendations comprises an optimized route to minimize wait time at the plurality of transports and maximize time spent on the plurality of routes during the pre-defined period of time based on the lowest proficiency measure; and transmitting, by the one or more processors, the route guidance to the given user, such that the given user obtains the route guidance on a computing device worn or carried by the given user, as an alert, wherein each of the one or more temporal recommendations are transmitted to the given user when the given user is at a given location where contemporaneous with receiving the route guidance, the given user, based on the given location, can take a specific route of the one or more specific routes of the plurality of routes, when the specific route is associated with one of the one or more temporal recommendations transmitted to the given user.

2. The computer-implemented method of claim 1, wherein the generating further comprises:
obtaining, by the one or more processors, based on the monitoring, a current location of the given user;
predicting, by the one or more processors, based on the movement profile for the specific user, the given location of the given user, wherein the given location of the given user comprises an anticipated location of the given user at a future time contemporaneous with the given user obtaining the route guidance transmitted to the given user; and
generating, by the one or more processors, the route guidance based on the given location of the given user.

3. The computer-implemented method of claim 2, wherein the transmitting further comprises:
transmitting, by the one or more processors, the route guidance at the future time.

4. The computer-implemented method of claim 1, wherein the transmitting further comprises:
obtaining, by the one or more processors, a request for the route guidance from the given user, wherein transmitting the route guidance to the given user is responsive to the one or more processors obtaining the request.

5. The computer-implemented method of claim 1, wherein identifying the given user further comprises:
obtaining, by the one or more processors, from a reader of the one or more readers, an indication that a lift ticket associated with the given user is within a vicinity of the physical environment.

6. The computer-implemented method of claim 1, wherein identifying the given user further comprises:
utilizing, by the one or more processors, a visual recognition device to capture an image of the given user and to identify the given user based on the image.

7. The computer-implemented method of claim 1, wherein monitoring the movement of the users within the physical environment further comprises:
obtaining, by the one or more processors, via personal computing devices of the users, movement data describing the movements of the users in the physical environment.

8. The computer-implemented method of claim 1, wherein generating the movement profile for the given user further comprises:
obtaining, by the one or more processors, from the movement data describing the movements of the users in the physical environment, movement data describing movements of the given user in the physical environment;
identifying, by the one or more processors, dependencies between characteristics in the movements of the given user and locations of the given user in the physical environment during the movements of the given user; and
generating, by the one or more processors, a set of rules representing the dependencies identified, wherein the machine learned movement patterns comprises the set of rules.

9. The computer-implemented method of claim 1, further comprising:
obtaining, by the one or more processors, operational information detailing a group of transports of the plurality of transports and a group of routes of the plurality of routes accessible to the users during the pre-defined period of time, and wherein the specific route is selected from the group of routes and the specific transport is selected from the group of transports.

10. The computer-implemented method of claim 2, wherein generating the movement profile is additionally based on timings associated with taking the plurality of transports at the future time, and wherein generating the movement profile further comprises:
monitoring, by the one or more processors, via image capture devices positioned at the plurality of transports, loading and unloading activities related to the plurality of transports;
retaining, by the one or more processors, the loading and unloading activities as historical data;
calculating, by the one or more processors, based on analyzing the historical data, predicted wait times and predicted transport times associated with the plurality of transports; and
interpolating, by the one or more processors, based on the predicted wait times and the predicted transport times, the timings associated with taking the plurality of transports at the future time.

11. The computer-implemented method of claim 1, wherein the physical environment comprises an alpine recreation area, the plurality of transports comprise ski lifts, the plurality of routes comprise ski trails, and the signals or the images of decodable indicia comprise lift tickets.

12. The computer-implemented method of claim 1, wherein the one or more readers comprise one or more radio frequency identification (RFID) readers and the signals or the images of decodable indicia comprise RFID cards.

13. The computer-implemented method of claim 1, wherein the alert is one or both of a visual alert and an audio alert.

14. The computer-implemented method of claim 13, wherein the alert is the visual alert and the alert is provided via one or both of Heads Up Display (HUD) goggles of the given user and a personal computing device of the given user.

15. The computer-implemented method of claim 13, wherein the alert is the audio alert and the alert is provided via one or both of wireless speakers in a helmet of the given user and a personal computing device of the given user.

16. A computer program product comprising:

a non-transitory computer readable storage medium readable by one or more processors and storing instructions for execution by the one or more processors for performing a method comprising:

monitoring, by the one or more processors, movement of users within a physical environment, wherein the physical environment comprises a plurality of routes to traverse and a plurality of transports, wherein each transport of the plurality of transports can be utilized by the users to reach a portion of the plurality of routes, wherein the physical environment further comprises one or more readers configured to read a signal or an image of decodable indicia, positioned at locations along the plurality of routes, wherein the monitoring comprises obtaining, from the one or more readers, locations of the users, based on the one or more readers accessing signals or images of decodable indicia associated with the users, when the users are within pre-defined ranges of the one or more readers, and wherein the signals or the images of decodable indicia are valid for a pre-defined period of time;

identifying, by the one or more processors, during the pre-defined period of time, a given user of the users within the physical environment;

determining, by the one or more processors, based on the monitoring, that the given user is navigating the physical environment in a group comprising at least one additional user of the users;

generating, by the one or more processors, movement profiles for each user in the group, wherein the movement profiles comprise machine learned movement patterns for each user in the group, based on the monitoring, wherein each movement profile comprises a proficiency measure for each user in the group at navigating the physical environment;

identifying, by the one or more processors, a specific user in the group, wherein the specific user has a lowest proficiency measure when compared to proficiency measures of a remainder of the group, wherein the specific user is not the given user;

continuously generating, concurrently with monitoring movements of the given user in the physical environment, by the one or more processors, based on the movement profile of the specific user and the locations of the users, route guidance for the given user, wherein the route guidance comprises one or more temporal recommendations for taking one or more specific routes of the plurality of routes to one or more specific transports of the plurality of transports, wherein the one or more temporal recommendations are consistent with the lowest proficiency measure and each of the one or more temporal recommendations comprises an optimized route to minimize wait time at the plurality of transports and maximize time spent on the plurality of routes during the pre-defined period of time based on the lowest proficiency measure; and transmitting, by the one or more processors, the route guidance to the given user, such that the given user obtains the route guidance on a computing device worn or carried by the given user, as an alert, wherein each of the one or more temporal recommendations are transmitted to the given user when the given user is at a given location where contemporaneous with receiving the route guidance, the given user, based on the given location, can take a specific route of the one or more specific routes of the plurality of routes, when the specific route is associated with one of the one or more temporal recommendations transmitted to the given user.

17. The computer program product of claim 16, wherein the generating further comprises:

obtaining, by the one or more processors, based on the monitoring, a current location of the given user;

predicting, by the one or more processors, based on the movement profile for the specific user, the given location of the given user, wherein the given location of the given user comprises an anticipated location of the given user at a future time contemporaneous with the given user obtaining the route guidance transmitted to the given user; and generating, by the one or more processors, the route guidance based on the given location of the given user.

18. The computer program product of claim 17, wherein the transmitting further comprises:

transmitting, by the one or more processors, the route guidance at the future time.

19. The computer program product of claim 16, wherein the transmitting further comprises:

obtaining, by the one or more processors, a request for the route guidance from the given user, wherein transmitting the route guidance to the given user is responsive to the one or more processors obtaining the request.

20. A system comprising:

a memory;

one or more processors in communication with the memory;

program instructions executable by the one or more processors via the memory to perform a method, the method comprising:

monitoring, by the one or more processors, movement of users within a physical environment, wherein the physical environment comprises a plurality of routes to traverse and a plurality of transports, wherein each transport of the plurality of transports can be utilized by the users to reach a portion of the plurality of routes, wherein the physical environment further comprises one or more readers configured to read a signal or an image of decodable indicia, positioned at locations along the plurality of routes, wherein the monitoring comprises obtaining, from the one or more readers, locations of the users, based on the one or more readers accessing signals or images of decodable indicia associated with the users, when the users are within pre-defined ranges of the one or more readers, and wherein the signals or the images of decodable indicia are valid for a pre-defined period of time;

identifying, by the one or more processors, during the pre-defined period of time, a given user of the users within the physical environment;

determining, by the one or more processors, based on the monitoring, that the given user is navigating the physical environment in a group comprising at least one additional user of the users;

generating, by the one or more processors, movement profiles for each user in the group, wherein the movement profiles comprise machine learned movement patterns for each user in the group, based on the monitoring, wherein each movement profile comprises a proficiency measure for each user in the group at navigating the physical environment;

identifying, by the one or more processors, a specific user in the group, wherein the specific user has a lowest proficiency measure when compared to proficiency measures of a remainder of the group, wherein the specific user is not the given user;

continuously generating, concurrently with monitoring movements of the given user in the physical environment, by the one or more processors, based on the movement profile of the specific user and the locations of the users, route guidance for the given user, wherein the route guidance comprises one or more temporal recommendations for taking one or more specific routes of the plurality of routes to one or more specific transports of the plurality of transports, wherein the one or more temporal recommendations are consistent with the lowest proficiency measure and each of the one or more temporal recommendations of the one or more temporal recommendations comprises an optimized route to minimize wait time at the plurality of transports and maximize time spent on the plurality of routes during the pre-defined period of time based on the lowest proficiency measure; and transmitting, by the one or more processors, the route guidance to the given user, such that the given user obtains the route guidance on a computing device worn or carried by the given user, as an alert, wherein each of the one or more temporal recommendations are transmitted to the given user when the given user is at a given location where contemporaneous with receiving the route guidance, the given user, based on the given location, can take a specific route of the one or more specific routes of the plurality of routes, when the specific route is associated with one of the one or more temporal recommendations transmitted to the given user.

* * * * *